T. F. Hall:

Sash Balance.

No. 243. A.I. Patented July 26, 1859.

Fig. 1

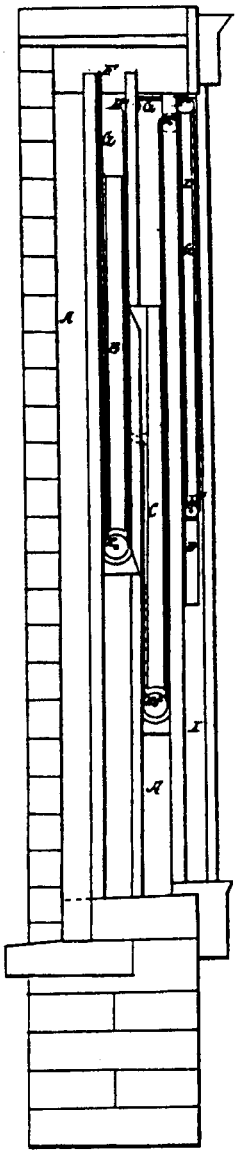

Fig. 2

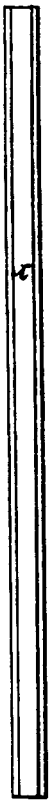

Fig. 3

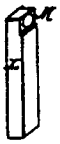

Witnesses:
A. C. Sherman
E. Brigham

Inventor:
T. F. Hall

No. 243, to original Letters Patent No. 22,365.—*Improvement in Hanging Window Sash.*

I claim the improved arrangement of cords, pulleys, and weights, hereinbefore described, for hanging the sashes of windows, so that either or both sash can be retained in any desired position in the frame, the sash and weights being suspended and moving in cords attached to the frame.

T. F. Hall.

DEPARTMENT OF COMMERCE
UNITED STATES PATENT AND TRADEMARK OFFICE

---

MISSING PAGE(S)

PATENT NUMBER AI 243 FOR THE ISSUE DATE 07/26/1859 HAS BEEN SCANNED/LOADED, BUT WITH MISSING PAGES(S). UPON RECEIPT OF THE MISSING PAGE(S), THE ENTIRE DOCUMENT WILL BE RESCANNED.

THIS NOTICE IS FOR THE MISSING PAGE(S) CONTAINING:

All Text